United States Patent [19]

Kawakami et al.

[11] Patent Number: 5,058,095
[45] Date of Patent: Oct. 15, 1991

[54] AUTOMATIC LOADING AND DRIVING RECORD MEDIUM PLAYER

[75] Inventors: Hiroshi Kawakami; Hiroshi Ebata, both of Kanagawa, Japan

[73] Assignee: Kabushiki Kaisha Toshiba, Kanagawa, Japan

[21] Appl. No.: 228,901

[22] Filed: Aug. 5, 1988

[30] Foreign Application Priority Data

Aug. 7, 1987 [JP] Japan .............................. 62-121172[U]

[51] Int. Cl.$^5$ ...................... G11B 3/58; G11B 17/04; G11B 5/016
[52] U.S. Cl. ................................ 369/77.1; 369/75.2; 369/191; 360/99.02
[58] Field of Search ...................... 369/191, 77.1, 77.2, 369/75.1, 75.2; 360/99.02, 99.03, 99.06, 99.07

[56] References Cited

U.S. PATENT DOCUMENTS

| | | | |
|---|---|---|---|
| 4,627,042 | 12/1986 | Hara | 369/77.1 |
| 4,686,665 | 8/1987 | Kamoshita | 369/215 X |
| 4,701,901 | 10/1987 | Imai | 369/77.1 X |
| 4,829,501 | 5/1989 | Seto et al. | 369/75.2 |
| 4,835,760 | 5/1989 | Aldenhoven et al. | 369/75.2 |

FOREIGN PATENT DOCUMENTS

| | | |
|---|---|---|
| 80317 | 1/1983 | European Pat. Off. . |
| 176298 | 4/1986 | European Pat. Off. . |
| 192448 | 8/1986 | European Pat. Off. . |
| 2051455 | 1/1981 | United Kingdom . |
| 2107506 | 4/1983 | United Kingdom ............... 369/77.1 |
| 2156141 | 10/1985 | United Kingdom . |
| 2178887 | 2/1987 | United Kingdom . |

Primary Examiner—David Trafton
Assistant Examiner—Kenneth B. Wells
Attorney, Agent, or Firm—Finnegan, Henderson, Farabow, Garrett and Dunner

[57] ABSTRACT

An automatic record medium player for automatically playing a record medium. The player includes a motor, a first drive member coupled to the motor for driving the record medium, a second drive member coupled to the motor, an automatic operation member for automatically supplying and/or withdrawing the record medium to and/or from the first drive member, a clutch member for selectively coupling the second drive member to the automatic operation member and a control member for controlling the clutch member in response to the automatic operation member.

10 Claims, 3 Drawing Sheets

AUTOMATIC LOADING AND DRIVING RECORD MEDIUM PLAYER

FIELD OF THE INVENTION

The present invention relates generally to an automatic record medium player, and more particularly, to an automatic loading compact disc player.

BACKGROUND OF THE INVENTION

A conventional automatic record medium player, e.g., a compact disc player for carrying out an automatic disc loading/unloading operation is constituted as shown in FIG. 1. In FIG. 1, a main chassis 11 is provided for supporting some elements as described below. A sub-chassis 12 with an L-shaped section is mounted on the main chassis 11. A motor support chassis 13 is provided over the sub-chassis 12. The motor support chassis 13 and the sub-chassis 12 hold a disc drive motor 14 therebetween. A driving shaft 14a of the disc drive motor 14 rotatably penetrates upward from the motor support chassis 13. A turntable 15 is mounted on the top end of the driving shaft 14a. Thus, the turntable 15 is driven by the disc drive motor 14.

A loading motor 16 is mounted on the sub-chassis 12. A driving shaft 16a of the loading motor 16 rotatably penetrates downward from the sub-chassis 12. A drive gear 17 is mounted on the top end of the driving shaft 16a. Thus, the drive gear 17 is driven by the loading motor 16.

The drive gear 17 is coupled to a disc lift 18 through first and second idler gears 19 and 20. The first and second idler gears 19 and 20 are rotatably mounted on the sub-chassis 12 by support pins 21 and 22, respectively. Both the support pins 21 and 22 extend from the sub-chassis 12. The drive gear 17 meshes with a large gear section 19a of the first idler gear 19. A small gear section 19b of the first idler gear 19 meshes with the second idler gear 20. The large gear section 19a and the small gear section 19b of the first idler gear 19 are coaxially made of one body.

The disc lift 18 comprises a lifting rod 23, a disc carriage 24, a travelling nut 25 and a lifting rod gear 26. The lifting rod 23 is rotatably supported on the main chassis 11 through a bearing 27. The lifting rod gear 26 is fixed to the lifting rod 23 coaxial thereto. The lifting rod gear 26 then meshes with the second idler gear 20. Thus, the lifting rod 23 is driven by the loading motor 16 through the drive gear 17, the first and second idler gears 19, 20 and the lifting rod gear 26, in turn.

The lifting rod 23 is provided with a feed screw 23a on the outer surface. The feed screw 23a extends along the axis of the lifting rod 23. The feed screw 23a of the lifting rod 23 screws into the travelling nut 25. The travelling nut 25 is fixed to the disc carriage 24. The disc carriage 24 is mounted to a guide member (not shown) slidable in the direction along the lifting rod 23. Thus, the disc carriage 24 moves in the direction along the lifting rod 23, when the lifting rod 23 is driven by the loading motor 16.

The rotation of the loading motor 16 changes in response to a loading phase or an unloading phase in the automatic disc loading operation. For example, the loading motor 16 rotates in a prescribed first direction during the loading phase. The loading motor 16 rotates in a second direction opposite to the first direction during the unloading phase. Thus, the disc carriage 24 travels downward, as shown by an arrow A in the drawing, during the loading phase. The disc carriage 24 travels upward, as shown by an arrow B in the drawing, during the unloading phase.

The disc carriage 24 is shaped as an almost rectangular plate. Further, the disc carriage 24 defines a round depression for carrying a disc 28 in the center of the rectangular plate and an opening around the center of the depression. The round depression has a diameter almost equal to the diameter of the disc 28 so that the disc 28 is placed in the correct position on the disc carriage 24. The opening allows the turntable 15 to penetrate the disc carriage 24 and to engage with the disc 28, when the disc carriage 24 moves downward. Further, the disc carriage 24 defines a slit for allowing an optical pickup to move in the radial direction of the turntable 15. The slit and the optical pickup are not shown in the drawing.

When the disc 28 is placed in the depression of the disc carriage 24, its center hole is positioned at the center of the turntable 15. Thus, the disc carriage 24 is moved downward when a disc loading operation is carried out. As a result, the disc 28 is placed on the turntable 15. The optical pickup is then able to trace an information track of the disc 28 placed on the turntable 15.

According to the conventional automatic loading compact disc player, at least two motors, e.g., the disc drive motor 14 and the loading motor 16, are necessary. Thus, the construction of the player becomes complicated.

Further, the disc player requires a relatively large space for accommodating the plurality of motors. The matter of space in the disc player may become a serious problem when miniturization of the size of the disc player is attempted. For example, a disc player for mounting in the dashboard of automobiles is limited in size to prescribed dimensions.

Furthermore, using a plurality of motors is expensive.

SUMMARY OF THE INVENTION

It is, therefore, an object of the present invention to provide an automatic record medium player in which the construction of the player is simplified.

Another object of the present invention to provide an automatic record medium player in which the size of the player is reduced.

A further object of the present invention to provide an automatic record medium player in which the cost of the player is reduced.

In order to achieve the above objects, an automatic record medium player for automatically playing a record medium according to one aspect of the present invention, includes a motor, a first drive member coupled to the motor for driving the record medium, a second drive member coupled to the motor, an automatic operation member for automatically supplying and/or withdrawing the record medium to and/or from the first drive member, a clutch member for selectively coupling the second drive member to the automatic operation member and a control member for controlling the clutch member in response to the automatic operation member.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
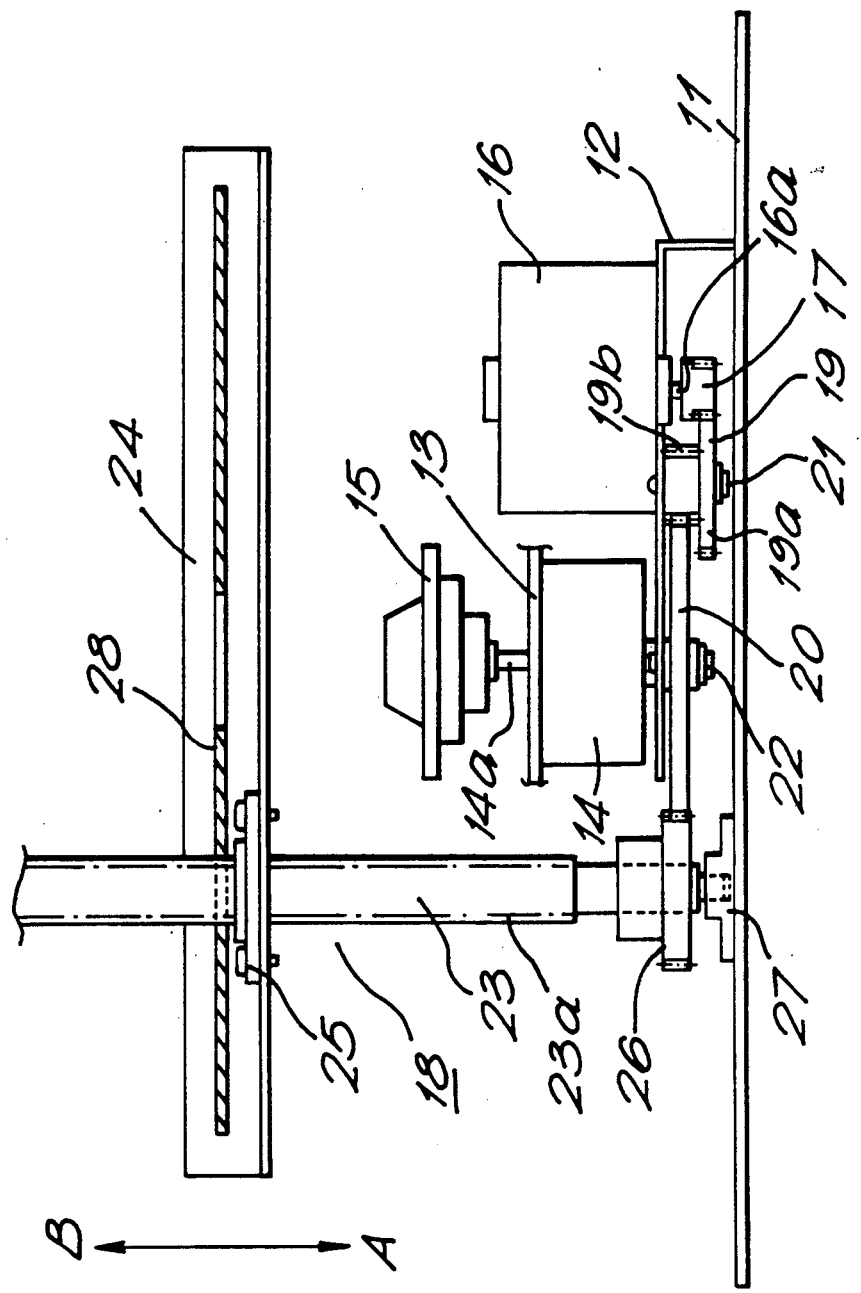
FIG. 1 is a sectional view showing a conventional automatic loading/unloading compact disc player.

The present invention is generally able to be adapted for automatically supplying and/or withdrawing a record medium to and/or from a record medium drive member of the apparatus. An embodiment of the present invention will be described in detail with reference to the FIGS. 2 and 3. Throughout the drawings, reference numerals or letters used in FIG. 1 (Prior Art) will be used to designate like or equivalent elements, for simplicity of explanation.

Figure 2:
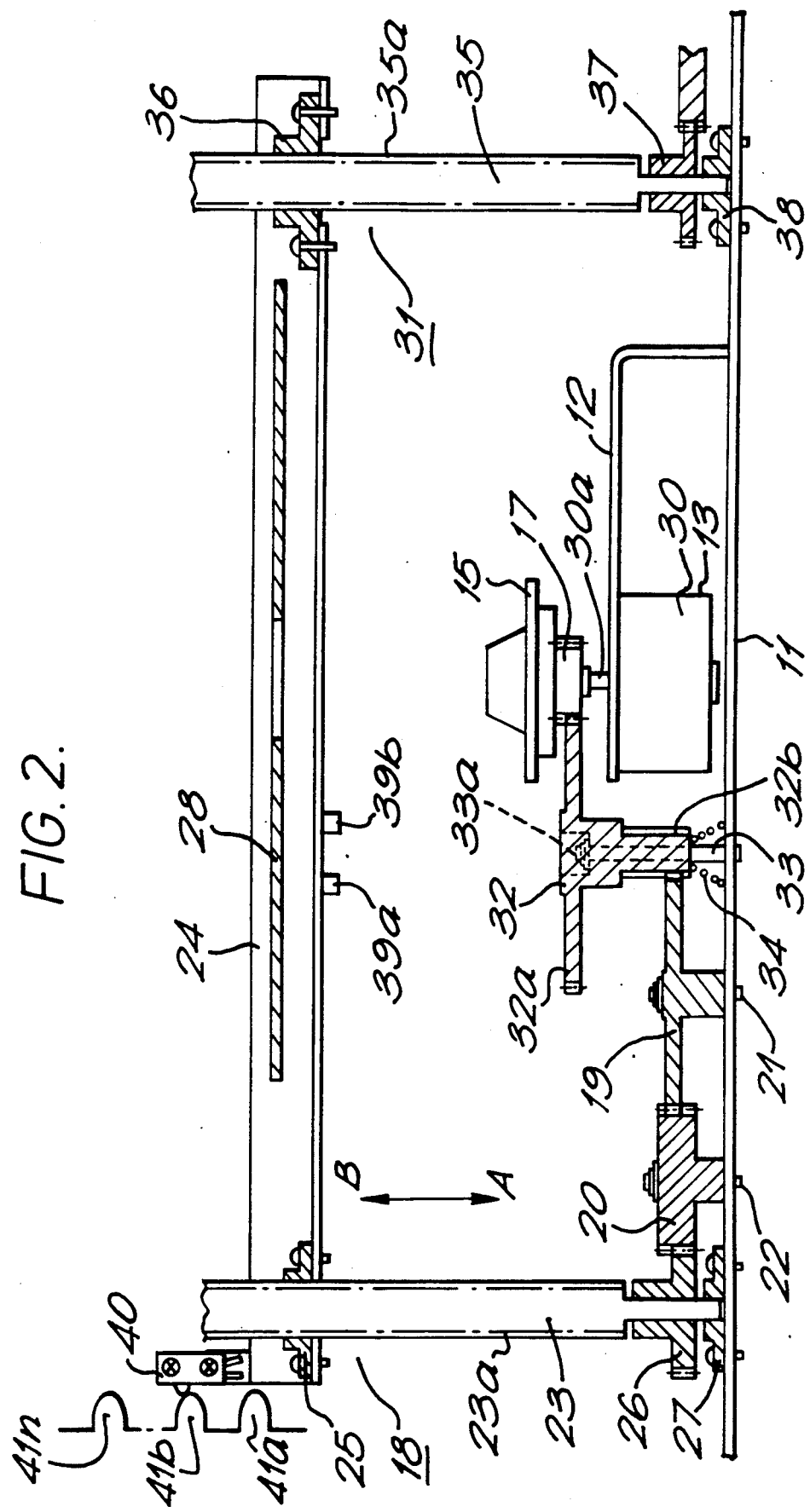
FIG. 2 is a sectional view showing an embodiment of the automatic loading/unloading compact disc player according to the present invention, in which a disc carriage is located in a raised position.

Referring now to FIG. 2, an embodiment of the automatic record medium player according to the present invention will be described in detail. The embodiment of FIG. 2 shows an example adapted for, e.g., an automatic loading/unloading compact disc player.

In FIG. 2, a main chassis 11 is provided for supporting some elements as described below. A sub-chassis 12 with an L-shaped section is mounted on the main chassis 11. A motor support chassis 13 is provided over the sub-chassis 12. The motor support chassis 13 holds a motor 30 therebetween. A driving shaft 30a of the motor 30 rotatably penetrates upward through the motor support chassis 13. A first drive member, e.g., a turntable 15 is mounted on the top of the driving shaft 30a. Thus, the turntable 15 is driven by the motor 30.

A second drive member, e.g., a drive gear 17, is mounted on the driving shaft 30a coaxial with the turntable 15. Thus, the drive gear 17 is driven by the motor 30. The drive gear 17 is coupled to the bottom of the turntable 15. For example, the drive gear 17 and the turntable 15 may be made of one body.

The drive gear 17 is coupled to an automatic operation member, e.g., a disc lift 18 and a carriage guide 31. The drive gear 17 and the disc lift 18 are coupled to each other through a selective coupling member, e.g., a clutch gear 32, a first idler gear 19 and a second idler gear 20. The clutch gear 32 and the first and second idler gears 19 and 20 are rotatably mounted on the main chassis 11 by support pins 33, 21 and 22, respectively. The support pins 33, 21 and 22 extend from the main chassis 11. The drive gear 17 meshes with a large gear section 32a of the clutch gear 32. A small gear section 32b of the clutch gear 32 meshes with the first idler gear 19. The large gear section 32a and the small gear section 32b of the clutch gear 32 are coaxially made of one body.

The clutch gear 32 is slidable along the support pin 33. A bias spring 34 is mounted between the clutch gear 32 and the main chassis 11. Thus, the bias spring 34 biases the clutch gear 32 upward. The upward position of the clutch gear 32 is defined by a stopper 33a formed on the top end of the support pin 33. In the upward position of the clutch gear 32, the large gear section 32a of the clutch gear 32 engages with the drive gear 17.

The disc lift 18 comprises a lifting rod 23, a disc carriage 24, a travelling nut 25 and a lifting rod gear 26. The lifting rod 23 is rotatably supported on the main chassis 11 through a bearing 27. The lifting rod gear 26 is fixed to the lifting rod 23 in coaxial thereto. The lifting rod gear 26 then meshes with the second idler gear 20. Thus, the lifting rod 23 is driven by the motor 30 through the drive gear 17, the clutch gear 32, the first and second idler gears 19, 20 and the lifting rod gear 26, in turn.

The lifting rod 23 is provided with a feed screw 23a on the outer surface. The feed screw 23a extends along the axis of the lifting rod 23. The feed screw 23a of the lifting rod 23 screws into the travelling nut 25. The travelling nut 25 is fixed to the disc carriage 24.

The disc carriage 24 is also mounted to the carriage guide 31. The carriage guide 31 comprises a guide rod 35, a travelling bearing 36 and a guide rod gear 37. The guide rod 35 is rotatably supported on the main chassis 11 through a bearing 38. The guide rod gear 37 is fixed to the guide rod 35 coaxial thereto. The guide rod gear 37 is then coupled to the clutch gear 32 through third and fourth idler gears. The third and fourth idler gears are not shown in the drawing but are constituted similar to the first and second idler gears 19 and 20, respectively. Thus, the guide rod 35 is also driven by the motor 30 through the drive gear 17, the clutch gear 32, the third and fourth idler gears and the guide rod gear 37 in turn.

The guide rod 35 is provided with a feed screw 35a on the outer surface. The feed screw 35a extends along the axis of the guide rod 35. The feed screw 35a of the guide rod 35 screws into the travelling bearing 36. That is, the travelling bearing 36 is similar to the travelling nut 25 of the disc lift 18. The travelling bearing 36 is fixed to the disc carriage 24.

The guide rod 35 of the carriage guide 31 is driven by the drive gear 17 together with the lifting rod 23. Thus, the disc carriage 24 stably moves in the direction along the lifting rod 23 and the guide rod 35. During the movement, the disc carriage 24 is prevented from rotating around the lifting rod 23 due to the carriage guide 31.

The rotation of the motor 30 changes in response to a loading phase or an unloading phase in the automatic disc loading operation. For example, the motor 30 rotates in a prescribed first direction during the loading phase. The motor 30 rotates in a second direction opposite to the first direction during the unloading phase. Thus, the disc carriage 24 travels downward, as shown by an arrow A in the figure, during the loading phase. The disc carriage 24 travels upward, as shown by an arrow B in the figure, during the unloading phase.

The disc carriage 24 is shaped to an almost rectangular plate. Further, the disc carriage 24 defines a round depression for carrying a disc 28 in the center of the rectangular plate and an opening around the center of the depression. The round depression has a diameter almost equal to the diameter of the disc 28 so that the disc 28 is placed in the correct position on the disc carriage 24. The opening allows the turntable 15 to penetrate the disc carriage 24 and to engage with the disc 28, when the disc carriage 24 moves downward. Further, the disc carriage 24 defines a slit for allowing an optical pickup to move in the radial direction of the turntable 15. The slit and the optical pickup are not shown in the drawing.

When the disc 28 is placed in the depression of the disc carriage 24, its center hole is positioned at the center of the turntable 15. Thus, the disc carriage 24 is moved downward, when a disc loading operation is carried out. As a result, the disc 28 is left on the turntable 15 when the disc carriage 24 has descended to its lowermost position. The optical pickup is then able to trace an information track of the disc 28 placed on the turntable 15.

Figure 3:
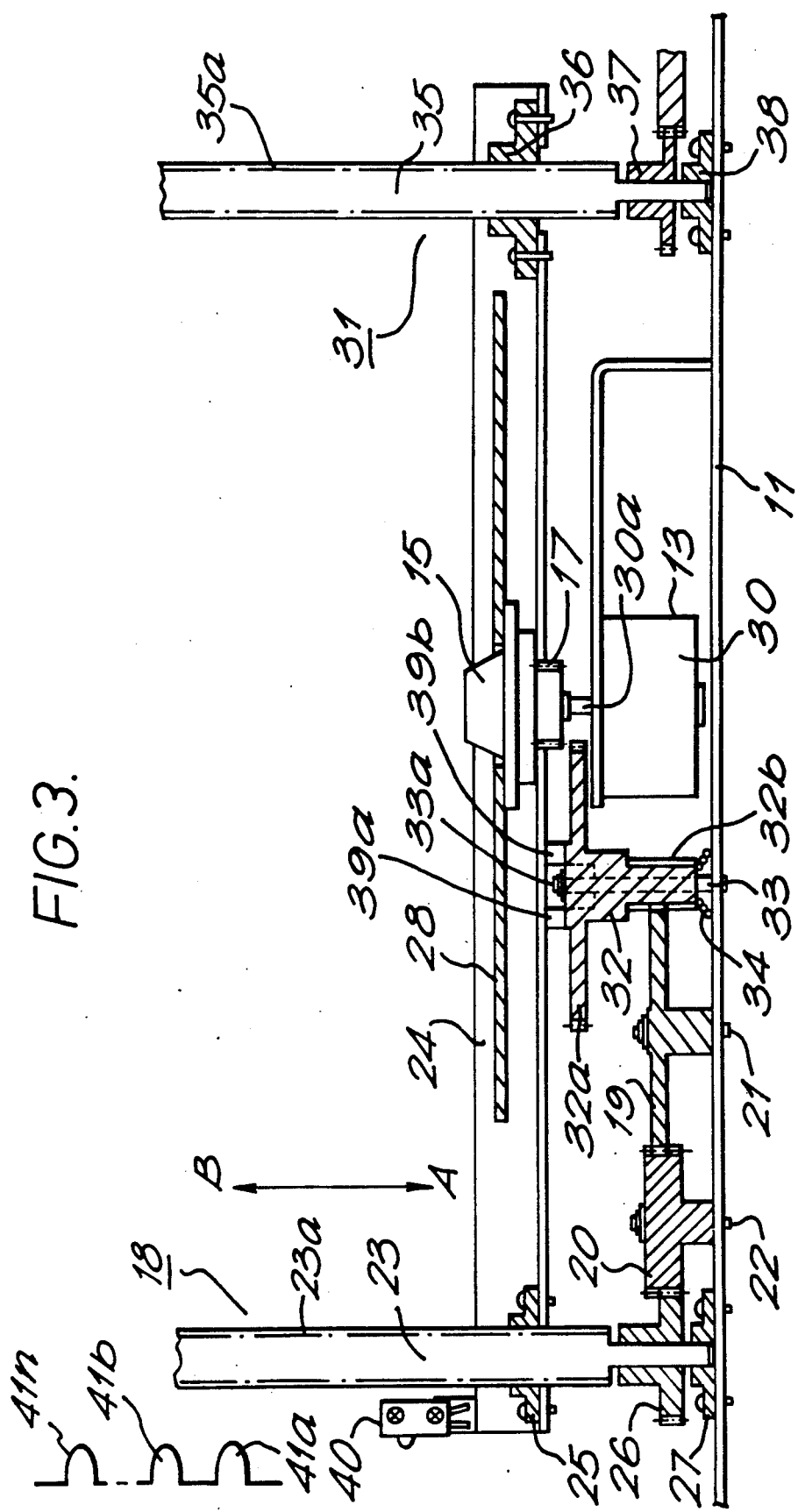
FIG. 3 is a sectional view showing an embodiment of the automatic loading/unloading compact disc player according to the present invention, in which the disc carriage is located in a lowered position.

The disc carriage 24 is provided with a pair of clutch controllers 39a and 39b at the bottom thereof. The clutch controllers 39a and 39b press the clutch gear 32 downward against the bias spring 34, as shown in FIG. 3, when the disc carriage 24 descends in the loading phase. Thus, the large gear section 32a of the clutch gear 32 disengages from the drive gear 17. The disc carriage 24 can descend to the lowermost position due to the inertia of the disc carriage 24 and the disc lift 18 after the the clutch gear 32 has disengaged from the drive gear 17.

When an unloading operation of the disc 28 is directed, a prescribed trigger means such as a conventional electromagnetic plunger (not shown) is activated. The unloading operation is automatically directed when a playback of the disc 28 has finished, or forcibly directed by a user's will. The plunger presses the clutch gear 32 upward. The clutch controllers 39a and 39b are slidably mounted to the disc carriage 24 in the perpendicular direction to the plane of the disc carriage 24. Thus, the clutch gear 32 meshes with the drive gear 32 against the clutch controllers 39a and 39b.

The motor 30 rotates in the second direction, as described before, during the unloading operation. Thus, the disc lift 18 drives the disc carriage 24 upward, as shown by the arrow B in the figure, through the gear engagements among the gears 17, 32, 19 20 and 26. The disc carriage 24 releases the disc 28 from the turntable 15 during the unloading operation. The disc 28 is, for example, unloaded from the disc carriage 24 by a conventional disc changing mechanism, when the disc carriage has reached to its uppermost position. Then, the disc 28 is stored in a prescribed disc storing space (not shown).

A raised position of the disc carriage 24 is determined in response to the applicable disc storing space. The raised position is detected by a counter 40 mounted on the disc carriage 24. The counter 40 counts notches 41a, 41b... 41n provided in the apparatus along the lifting rod 23. The disc carriage 24 stops at a prescribed raised position, when the counter 40 detects a notch corresponding to a prescribed disc storing space to which the disc 28 is to be stored.

After the disc 28 has been unloaded, the disc carriage 24 moves to another raised position for loading another disc thereon. The disc carriage 24 then descends for carrying the other disc to the turntable 15. Thus, the automatic disc changing operation is completed.

In the embodiment as described above, the gear couplings among the drive gear 17, the clutch gear 32, the first and second idler gears 19, 20 and the lifting rod gear 26 are used to transmit the rotation of the motor 30 to the disc lift 18. However, other transmission means such as roller couplings or belt couplings, etc. may be used. Further, in the above-mentioned embodiment a disc such as a compact disc is explained as a record medium to be played by the player. However, the present invention can be easily adapted for a magnetic tape player such as a cassette tape player (analog tape player), a digital audio tape player (DAT) or a video tape player. In this case, a capstan or a tape reel spindle is mounted on the drive shaft 30a of the motor 30 as a tape drive member corresponding to the turntable 15 in the above embodiment.

In the above-mentioned embodiment, the carriage guide 31 is constructed similar to the disc lift 18. That is, the carriage guide 31 is driven by the drive gear 17. However, the carriage guide 31 can be constructed independently from the drive gear. In this case, the outer surface of the guide rod 35 is made to a flat plane. Then, the travelling bearing 36 is made as a conventional lubricative bearing.

In the above-mentioned embodiment, the present invention is adapted for automatically loading/unloading a disc. Thus, the carriage guide 24 is provided for loading/unloading discs, and the disc lift 18 is provided for moving the disc carriage 24 upward and downward. However, the present invention can be adapted for other automatic operations, e.g., an automatic disc changing operation. In this case, the automatic operation member corresponding to the disc lift 18 in the above embodiment is used for automatically operating the automatic disc changing. Then, the clutch controllers 39a and 39b provided adjacent to the clutch gear 32 are activated during the automatic disc changing operation.

As described above, the present invention can provide an extremely preferable automatic record medium player which is simple in construction, compact in size and cheaper in cost.

While there has been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. An automatic record medium player for automatically playing a record medium comprising:
a motor means which rotates in a first direction and in a second direction, opposite to that of the first direction;
a first drive member coupled to the motor means for driving a record medium supplied thereto;
a second drive member coupled to the motor means;
a movable automatic operation member for automatically supplying and/or withdrawing the record medium to and/or from the first drive member in response to the first direction rotation of the motor means and/or the second direction rotation of the motor means, the automatic operation member including a carriage member for loading and/or unloading the record medium to and/or from the first drive member and a guide member for guiding the loading and/or unloading movement of the carriage member;

a clutch member for selectively supplying the second drive member to the automatic operation member; and a control member for controlling the clutch member in response to movement of the automatic operation member, the control member being mounted on the carriage member and being movable together with the carriage member to a position engaging the clutch member.

2. The player of claim 1 wherein the control member includes clutch control means for disengaging the clutch member from the second drive member after the carriage member has supplied the record medium to the first drive member.

3. The player of claim 2 further comprising means for activating the clutch member to engage with the second drive member with the control member.

4. The player of claim 1 also including gear means for coupling the guide member with the clutch member.

5. The player of claim 1 wherein the automatic operation member includes a record medium changing member.

6. The player of claim 5 wherein the control member includes clutch control means aligned with the clutch member and attached to the record medium changing member.

7. An automatic disc player for automatically playing a disc comprising:

a motor means;

a disc turntable coupled to the motor means for rotating the disc;

a drive member coupled to the motor means;

a movable automatic operation member for automatically supplying and/or withdrawing the disc to and/or from the disc turntable, the automatic operation member including a disc carriage for loading and/or unloading the disc to and/or from the disc turntable and a guide member for guiding the loading and/or unloading movement of the disc carriage;

a clutch member for selectively coupling the drive member to the automatic operation member; and a control member for controlling the clutch member in response to the movement of the automatic operation, the control member being mounted on a disc carriage and being movable together with the disc carriage to a position engaging the clutch member.

8. The player of claim 7 wherein the control member includes clutch control means for disengaging the clutch member from the drive member after the disc carriage has loaded the disc on the disc turntable.

9. The player of claim 8 further comprising an electromagnetic plunger for activating the clutch member to engage with the drive member.

10. The player of claim 7 wherein the guide member is selectively interlocked with the drive member.

* * * * *